UNITED STATES PATENT OFFICE.

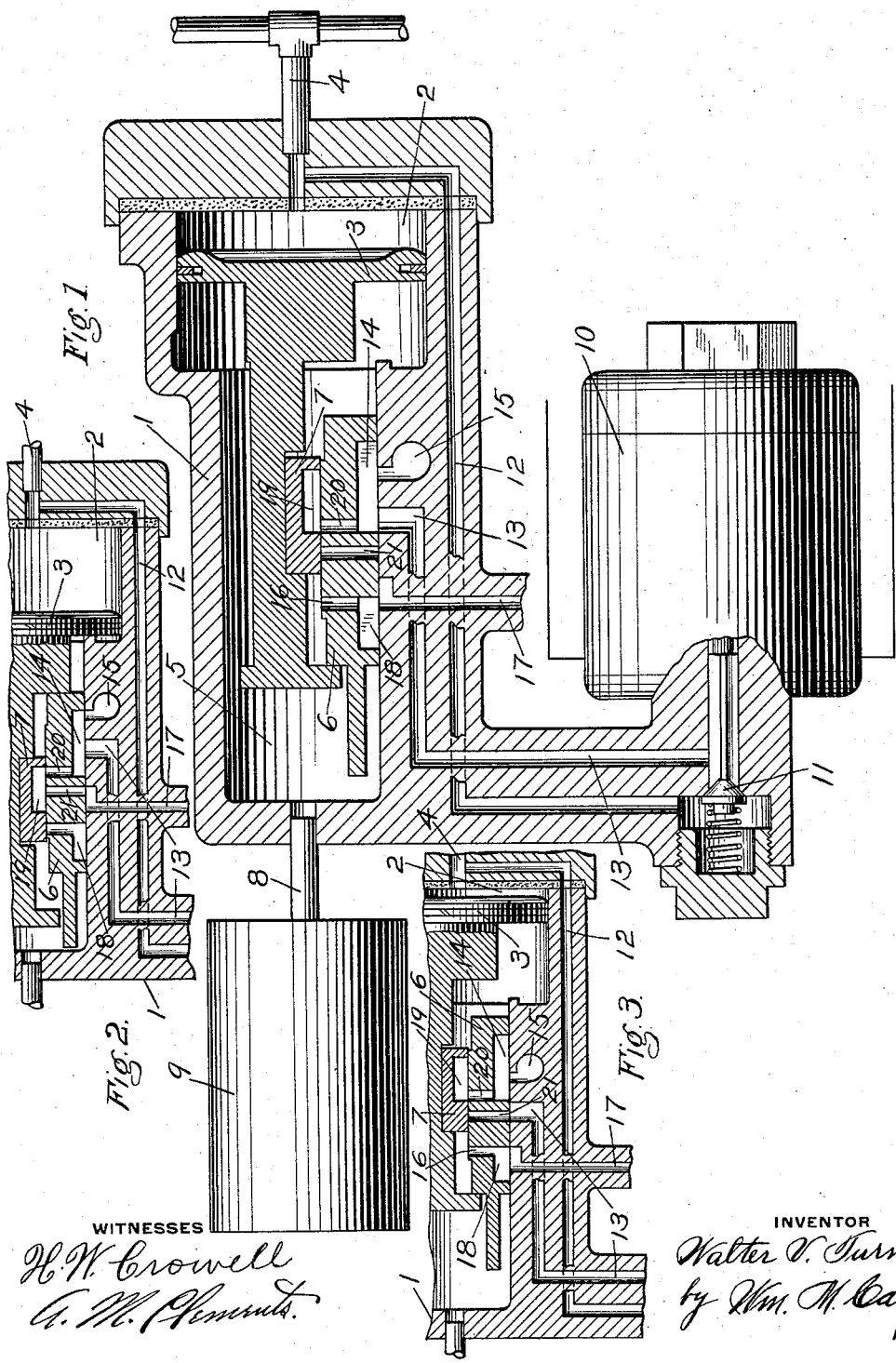

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

1,174,105.

Specification of Letters Patent.

Patented Mar. 7, 1916.

Application filed October 6, 1914. Serial No. 865,254.

*To all whom it may concern:*

Be it known that I, WALTER V. TURNER, a citizen of the United States, residing at Edgewood, in the county of Allegheny and State of Pennsylvania, have invented new and useful Improvements in Electropneumatic Brakes, of which the following is a specification.

This invention relates to fluid pressure brakes, and more particularly to a brake of the electro-pneumatic type.

In the automatic fluid pressure brake, an excessive rate of reduction in brake pipe pressure in service applications is prevented by the employment of the so-called equalizing discharge valve device, even where there is leakage from the brake pipe.

In the case of the electro-pneumatic brake, where an electric application is effected by venting fluid from the brake pipe through the operation of a magnet valve, a similar excessive reduction in brake pipe pressure may be produced, particularly in connection with brake pipe leakage, which is liable to cause an undesired emergency application of the brakes.

The principal object of my invention is to provide means for limiting the rate of reduction in brake pipe pressure when the brakes are electro-pneumatically applied.

In the accompanying drawing; Figure 1 illustrates an electro-pneumatic brake apparatus with my improvement embodied therein, showing the parts in application position; Fig. 2 a fragmentary sectional view of the equalizing valve device with the parts in normal release position; and Fig. 3 a similar view, showing the parts in over reduction position.

As shown in the drawing, the construction may comprise a casing 1 having a piston chamber 2 containing an equalizing piston 3 and connected to brake pipe 4, and having a valve chamber 5 containing a main slide valve 6 and a graduating valve 7 mounted on and having a movement relative to the main slide valve, the valve chamber 5 being connected by pipe 8 to the usual auxiliary reservoir 9.

An electric application magnet 10 is adapted to control a valve 11 for venting fluid from the brake pipe through passage 12 to passage 13 which leads to the seat of the main valve 6.

In the release position of the main slide valve 6, as shown in Fig. 2 of the drawing, passage 13 is connected by cavity 14 with exhaust port 15 so that when the magnet 10 is energized on each car of the train to effect an application of the brakes, the valve 11 is opened and establishes communication from the brake pipe through passages 12 and 13 and cavity 14 to exhaust port 15. Fluid under pressure is thereupon vented from the brake pipe and the equalizing piston 3 is moved out to application position, as shown in Fig. 1 of the drawing. In this position, the cavity 14 still maintains communication between the passage 13 and the exhaust port 15, while service port 16, which was uncovered by the preliminary movement of the graduating slide valve 7, is brought into register with brake cylinder port 17. Fluid under pressure is now supplied from the auxiliary reservoir 9 to the brake cylinder in the usual manner, and if the magnet valve 11 is closed, the reduction in brake pipe pressure ceases, and as soon as the auxiliary reservoir pressure substantially equalizes with the reduced brake pipe pressure, the graduating valve 7 is moved back by the piston 3 in the usual manner, closing the service port 16. If the magnet valve 11 is left open and there should be brake pipe leakage such that the total rate of reduction in brake pipe pressure exceeds the rate at which the auxiliary reservoir pressure is reduced by flow to the brake cylinder, then the equalizing piston will move out beyond service application position to partially or totally cut off communication from the passage 13 to the exhaust port 15, as shown in Fig. 3 of the drawing. During this movement, it will be noted that a foot extension 18 of the service port 16 maintains communication with brake cylinder port 17, so that fluid continues to flow from the auxiliary reservoir to the brake cylinder until the auxiliary reservoir pressure becomes slightly less than the reduced brake pipe pressure, when the piston 3 will move the graduating valve back, so that cavity 19 therein connects a port 20 leading from cavity 14 with a port 21 which registers with passage 13. Since cavity 14 is still in register with exhaust port 15, it will be seen that communication is now open so that fluid can be again vented from the brake pipe, if the magnet valve 11 is still open. If there is any tendency of the brake pipe pressure reducing faster than the predetermined rate, the piston 3 will move the graduating valve 7 and thus automatically restrict the passage 21 until the rate of reduction in brake pipe pressure corresponds with the rate of reduction in auxiliary reservoir pressure by flow to the brake cylinder.

Having now described my invention, what I claim as new and desire to secure by Letters Patent, is:

1. In an electro-pneumatic brake, the combination with a brake pipe and an equalizing valve device operated upon a reduction in brake pipe pressure for effecting an application of the brakes, of electrically controlled means for venting fluid from the brake pipe through a communication controlled by said equalizing valve device.

2. In an electro-pneumatic brake, the combination with a brake pipe and an equalizing valve device operated upon a reduction in brake pipe pressure for effecting an application of the brakes, of an electrically controlled valve for venting fluid from the brake pipe through ports controlled by said valve device, communication through said ports being open during the movement of the valve device to service application position and adapted to be closed upon further movement.

3. In an electro-pneumatic brake, the combination with a brake pipe, a main valve and an auxiliary valve for controlling the admission of fluid to the brake cylinder, and a piston subject to brake pipe pressure for operating said valves, of an electrically controlled valve for venting fluid from the brake pipe through a cavity in the main valve under a service rate of reduction in brake pipe pressure and ports controlled by the auxiliary valve through which the venting of fluid from the brake pipe is controlled when the brake pipe pressure is reduced at a greater rate.

4. In an electro-pneumatic brake, the combination with a brake pipe and a triple valve device operated by a reduction in brake pipe pressure for effecting an application of the brakes, of electrically controlled means for venting fluid from the brake pipe through a communication controlled by said valve device, movement of said valve device beyond service application position being adapted to close said communication.

5. In an electro-pneumatic brake, the combination with a brake pipe and a triple valve device comprising a main valve, an auxiliary valve having a movement relative to the main valve, and a piston subject to brake pipe pressure for operating said valves, of an electrically controlled valve for venting fluid from the brake pipe through a communication controlled by said triple valve device, the main valve thereof being adapted to close said communication upon movement beyond service position and the auxiliary valve being adapted to then control said communication.

In testimony whereof I have hereunto set my hand.

WALTER V. TURNER.

Witnesses:
A. M. CLEMENTS,
S. W. KEEFER.

Copies of this patent may be obtained for five cents each, by addressing the "Commissioner of Patents, Washington, D. C."